United States Patent [11] 3,551,681

| [72] | Inventor | Robert W. Astheimer |
| | | Westport, Conn. |
| [21] | Appl. No. | 394,585 |
| [22] | Filed | Sept. 4, 1964 |
| [45] | Patented | Dec. 29, 1970 |
| [73] | Assignee | Barnes Engineering Company |
| | | Stamford, Conn. |
| | | a corporation of Delaware |

[54] NON-SCANNING HORIZON POSITION INDICATOR INDEPENDENT OF PLANET RADIANCE VARIATIONS UTILIZING INVERTED OVERLAPPING FIELDS OF VIEW
2 Claims, 4 Drawing Figs.

[52] U.S. Cl. .................................................. 250/209,
250/83.3, 250/202, 250/203, 250/219, 250/220, 250/237
[51] Int. Cl. ........................................................ H01j 39/12,
H01j 39/00
[50] Field of Search .......................................... 250/220,
202, 203, 219RG, 237, 83.3IR, 209

[56] References Cited
UNITED STATES PATENTS

| 2,700,318 | 1/1955 | Snyder | 250/220X |
| 3,084,261 | 4/1963 | Wilson | 250/203 |
| 3,194,966 | 7/1965 | Hulett | 250/203 |

Primary Examiner—Ralph G. Nilson
Assistant Examiner—T. N. Grigsby
Attorneys—Robert Ames Norton, Joseph Levinson and John E. Benoit ABSTRACT: A nonscanning horizon position indicator is provided having at least two radiometric cells comprised of an objective, a triangular field mask positioned in the focal plane of the objective, a field lens and a radiation detector. The cells are positioned to provide inverted overlapping triangular fields of view with the outputs from their detectors combined and ratioed to provide an output which is linearly proportional to the horizon position and independent of planet radiance.

PATENTED DEC 29 1970

3,551,681

INVENTOR
ROBERT W. ASTHEIMER
BY Joseph Levinson
ATTORNEY

NON-SCANNING HORIZON POSITION INDICATOR INDEPENDENT OF PLANET RADIANCE VARIATIONS UTILIZING INVERTED OVERLAPPING FIELDS OF VIEW

This invention relates to horizon sensors, and more particularly to horizon sensors of the nonscanning type which provide horizon position information which is independent of planet radiance variations.

Horizon sensors are utilized for determining the orientation and altitude of high-flying aircraft, missiles, satellites, and the like, by utilizing the large difference in radiation represented by a line of discontinuity between a planet's atmosphere and outer space. The planet's atmosphere produces a relatively large amount of radiation as compared to the radiation of outer space. One type of horizon sensor continually scans across the horizon, applying the optical radiation received therefrom to a radiation detector whose electrical output is utilized for generating pulses which are utilized to determine the position of the vehicle with reference to the horizon. The present invention relates to radiation balance type horizon sensors which utilize a plurality of radiation detectors positioned on each side of the horizon; whose outputs are utilized to provide an error transfer function which provides a means for locating the position of the horizon with respect to the vehicle in which the detectors are mounted. With this type of sensor, a null point or zero output signal is indicative of a horizon crossing. The accuracy of radiation balance type horizon sensors is limited by variations in planetary radiance. Even in narrow radiation bands such as the 15 micron carbon dioxide band, the radiance from a planet such as earth may vary by a factor of 2 with respect to season and geographic position over the planet. The error produced by variations in planetary radiance can be reduced by decreasing the field of view of the radiation detectors, but this severely restricts the altitude range over which the instrument can operate, and accordingly the range over which proportional error signals can be derived. Furthermore, variations is radiance also directly affect the slope of the error transfer function, and this slope must remain the same in order to provide accuracy in locating the position of the horizon. Nevertheless, there is a great deal of interest in this type of horizon sensor because of its simplicity and lack of moving parts. It would be most desirable if the source of error caused by variations in planetary radiance could be alleviated.

Accordingly, it is an object of this invention to provide a nonscanning horizon position indicator independent of planet radiance variations.

In carrying out this invention in one illustrative embodiment thereof, a pair of radiometers which are essentially identical, each including in optical alignment an objective lens, a field mask located substantially at focal plane of the objective lens, a field lens, and a radiation detector, are situated to view a horizon with reversed, overlapping fields of view. To obtain this position, one radiometric cell is inverted with respect to the other. Electrical means are connected to the radiation detectors for combining and ratioing signals derived therefrom in accordance with radiation applied to the detectors from their overlapping fields of view, to provide a signal which is linearly proportional to a horizon position and independent of planet radiance.

The invention, both as to organization and method of operation, together with other objects and advantages thereof, may best be understood by reference to the following description taken in connection with the accompanying drawings, in which:

FIG. 1 schematically shows the basic type radiometric cell utilized in the present invention;

Figure 1:
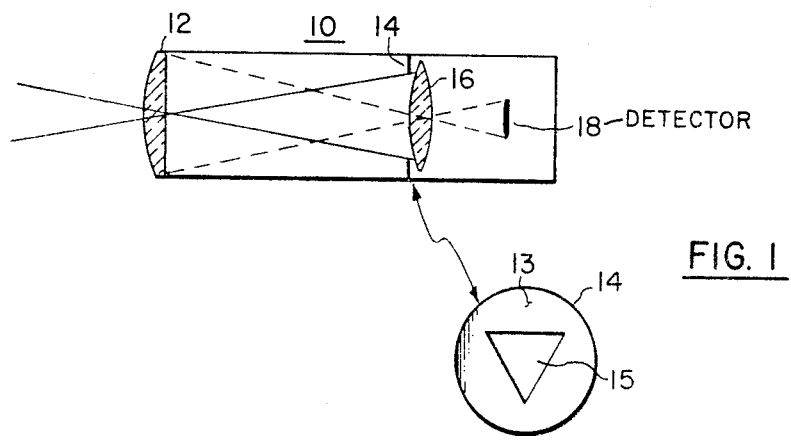

Referring now to FIG. 1 a simple radiometric cell, referred to generally with the reference character 10, is utilized as a basic element of the horizon sensor of this invention. The radiometric cell 10 includes an objective lens 12, a field mask 14, a field lens 16, and a radiation detector 18. The field mask 14 has an opaque portion 13 and a radiation transparent portion 15. Although the mask can be of various shapes and sizes, it is illustrated in the present embodiment as being triangular, which is the preferred configuration in accordance with this invention, due to the ease of the electronic processing required to provide the proper signal ratioing to produce a linear transfer function. The field mask 14 is located substantially at or near the focal plane of the objective 12. The radiation detector 18 may be of any suitable form, but in the present embodiment a thermopile is preferred. Although not shown, the thermopile 18 will require ambient temperature compensation in the form of a thermistor bead, since no radiation reference is shown and it is desired to provide an instrument in its simplest form. In accordance with this invention a pair of identical radiometric cells 10 have overlapping fields of view, which is obtained by inverting one of the radiometric cells 10 with respect to the other. For two-axis stabilization in horizon sensor use, at least three pairs of radiometric cells would be required, or a total of six radiometric cells 10. With such a combination, not only is the local vertical indicated, but the actual horizon as well.

Figure 2:
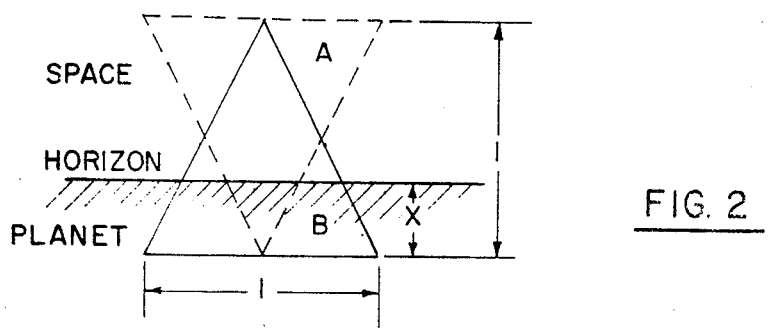
FIG. 2 shows the overlapping inverted fields of view which are provided by the use of a pair of the basic radiometric cells as shown in FIG. 1 when utilized in accordance with this invention.

Utilizing a pair of the radiometric cells 10, reversed overlapping triangular fields of view designated A and B are shown in FIG. 2 with the field of view of each detector extending across the planet horizon and into space. Assume the vertical and horizontal dimensions normalized to one unit, as is depicted in FIG. 2, and let $x$ be the relative position of the horizon within the field of view ($0<x<1$). The detector signal appearing at the detector 18, which is generated by the planet, is proportional to the planet radiance N, and the area of field seen by the detector 18. Because of the triangular field masks 14, the signal varies as a quadratic function of the position of $x$. Accordingly, the signal generated by the planet in field A ($V_A$) is proportional to $\frac{1}{2}Nx^2$, while signal $V_B$ generated by the detector having a field of view B is proportional to $N(x-\frac{1}{2}x^2)$. Taking the ratio of $V_A$ to $V_B$ and solving for $x$:

$$x = \frac{2V_A}{V_A + V_B} = V_x.$$

Alt should be noted that the planet radiance is eliminated. Thus by the simple addition and ratioing of the signals derived from the two fields of view A and B, a voltage $V_x$ is obtained which is linearly proportional to the horizon position and independent of the planet radiance.

Figure 3:
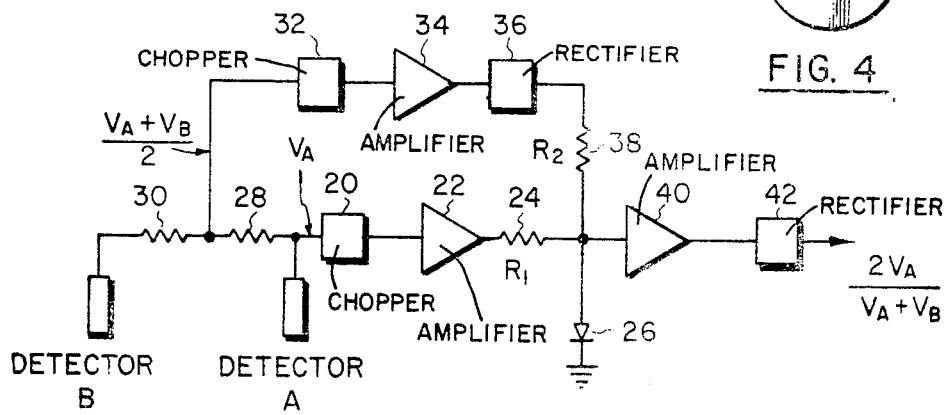
FIG. 3 is an electrical schematic diagram of a circuit suitable for combining and ratioing signals derived from the fields of view shown in FIG. 2 to obtain a signal which is linearly proportional to the horizon position and independent of planet radiance.

The combining and ratioing of signals from a pair of basic radiometric cells 10 may take the form as shown in FIG. 3 In order to simplify the description and to be consistent with the explanation given with respect to FIG. 2, the radiation detectors 18 are shown in FIG. 3 as being detectors A and B, which represent the fields of view A and B as shown on FIG. 2. The output of detector A is applied via a chopper 20 to an AC amplifier 22 whose AC output is applied via resistor 24 ($R_1$) to a forward biased diode 26. At the same time the combined output of detectors A and B is applied via resistors 28 and 30, respectively, through a chopper 32 to an AC amplifier 34 whose output is rectified by rectifier 36 and applied via a resistor 38 ($R_2$) to the diode 26. The output of this combination is amplified by an AC amplifier 40 and rectified by rectifier 42 to produce the desired ratio or position of $x$.

The operation of the circuit of FIG. 3 to provide the proper ratioing is based on the fact that the incremental or small angle resistance $r$ of a forward biased silicon diode 26 is inversely proportional to the bias current $I_b$ over a range of three decades such that: $r = \dfrac{k}{I_b}$. Therefore if a circuit is arranged as shown in FIG. 3 so that the bias current of the diode 26 is determined by one voltage $V_2$ appearing across resistor 38 ($R_2$) and the forward resistance of the diode 26 acts to attenuate voltage $V_1$ appearing across resistor 24 ($R_1$), the resulting voltage across the diode 26 ($V_0$) will be a division of the voltage $V_1$ by $V_2$, derived as follows:

$$V_0 = \frac{V_1 r}{R_1 + r} = \frac{V_1 r}{R_1} \text{ if } R_1 \gg r$$

$$r = \frac{k}{I_b} = \frac{kR_2}{V_2}$$

Substituting for $r$:

$$V_0 = \left(\frac{kR_2}{R_1}\right)\frac{V_1}{V_2}$$

For proper operation $V_2$ should be a DC voltage, which is provided by the rectification of the output of AC amplifier 34, and $V_1$ should be an AC voltage as provided by the output of the amplifier 22. Also, $V_1$ must be small enough so that is does not affect the incremental resistance of the diode 26 established by $V_2$.

It should be appreciated that the circuitry shown in FIG. 3 is suitable for the configuration of the field mask 14 which is shown in triangular form. Other shapes of field mask would probably require more complex electronic circuitry for providing the proper ratios. This is why the triangular field mask is the preferable form in the present invention. The choppers 20 and 32 as shown in FIG. 3 may be of the electronic type, which function to periodically interrupt a signal being applied to the AC amplifiers 22 and 34. They may, for example, be electronic switches, such as might be provided by a multivibrator or by photoswitching.

Figure 4:
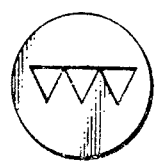
FIG. 4 shows a modified field mask which may be utilized in the present invention.

If the fields of view as shown in FIG. 2 are large enough so that radiance variations take place within their areas, the problem may be alleviated by providing a mask multiple triangles as, for example, is shown in FIG. 4. In such a case, an identical mask inverted thereto would provide the reversed overlapping triangular fields of view in the same manner as shown in FIG. 2. The same circuitry as shown in FIG. 3 would be suitable for providing the proper electronic proportioning to locate accurately the horizon position. The number of multiple triangles which may be required in the field mask configuration would depend on the variations in radiance over the field of interest.

Since other modifications, varied to fit particular operating requirements an environments, will be apparent to those skilled in the art, the invention is not considered limited to the examples chosen for purpose of disclosure, and covers all changes and modifications which do not constitute departures from the true spirit and scope of this invention.

I claim:

1. A nonscanning horizon position indicator independent of planet radiance variations comprising:
    a. first and a second radiometric cell each having in optical alignment an objective lens, a field mask having a triangular opening therein located substantially at the focal plane of said objective lens, a field lens, and a radiation detector;
    b. the position of one of said first and second radiometric cells being inverted with respect to the other of said cells and providing inverted overlapping triangular fields of view of radiation edge discontinuity; and
    c. electrical means connected to said radiation detectors for combining and ratioing signals derived from said detectors in accordance with radiation applied thereto to provide a signal which is linearly proportional to the horizon position and indpendent of planet radiance.

2. The structure set forth in claim 1 wherein said field mask includes a plurality of triangular openings therein.